United States Patent
Shen (10) Patent No.: US 7,913,048 B2
(45) Date of Patent: Mar. 22, 2011

(54) DATA SUBSCRIBE-AND-PUBLISH MECHANISMS AND METHODS FOR PRODUCER-CONSUMER PRE-FETCH COMMUNICATIONS

(75) Inventor: Xiaowei Shen, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 11/493,441

(22) Filed: Jul. 26, 2006

(65) Prior Publication Data

US 2010/0241813 A1   Sep. 23, 2010

(51) Int. Cl.
*G06F 12/00* (2006.01)
(52) U.S. Cl. ........ 711/163; 711/137; 711/141; 711/146; 711/154; 710/200; 707/626; 707/627
(58) Field of Classification Search .................. 711/147, 711/163
See application file for complete search history.

(56) References Cited

U.S. PATENT DOCUMENTS

| | | | | |
|---|---|---|---|---|
| 5,442,755 A | * | 8/1995 | Shibata | 710/108 |
| 5,588,131 A | * | 12/1996 | Borrill | 711/146 |
| 6,134,634 A | * | 10/2000 | Marshall et al. | 711/143 |
| 6,138,141 A | * | 10/2000 | DeSimone et al. | 709/203 |
| 6,311,260 B1 | * | 10/2001 | Stone et al. | 711/213 |
| 6,314,500 B1 | * | 11/2001 | Rose | 711/148 |
| 6,567,893 B1 | * | 5/2003 | Challenger et al. | 711/118 |
| 7,191,180 B2 | * | 3/2007 | Evans et al. | 707/10 |
| 7,237,245 B2 | * | 6/2007 | Hinson et al. | 719/318 |
| 2004/0260885 A1 | * | 12/2004 | Landin et al. | 711/144 |
| 2004/0260888 A1 | * | 12/2004 | Hoogerbrugge et al. | 711/147 |

OTHER PUBLICATIONS

Adam Donlin, "An Analysis of the Producer-Consumer Problem," Jan. 2003.*
Ralph C. Hilzer, Jr, "Synchronization of the Producer/Consumer Problem using Semaphores, Monitors, and the Ada Rendezvous," Jul. 1992.*

* cited by examiner

*Primary Examiner* — Kevin L Ellis
*Assistant Examiner* — Kalpit Parikh
(74) *Attorney, Agent, or Firm* — F. Chau & Associates, LLC (57) ABSTRACT

A system supporting producer-consumer pre-fetch communications includes a first processor, wherein the first processor is a producer node, and a second processor, wherein the second processor is a consumer node. The system further includes a data subscribe mechanism for performing a data subscribe operation at the consumer node, wherein the data subscribe operation records that a memory address is subscribed at the consumer node, a data publish mechanism for performing a data publish operation at the producer node, wherein the data publish operation sends data of the memory address from the producer node to the consumer node if the memory address is subscribed at the consumer node, and a communication network coupled to the producer node and the consumer node for enabling communicating between the producer node and the consumer node.

20 Claims, 6 Drawing Sheets

509 — *Consumer: Subscribe (memory address);*
510 — *Consumer: Acquire (lock memory address);*
511 — *Producer: Write (memory address, data);*
512 — *Producer: Publish (memory address);*
513 — *Producer: Release (lock on memory address);*
514 — *Consumer: Read (memory address);*

509 — Consumer: Subscribe (memory address);
510 — Consumer: Acquire (lock memory address);
511 — Producer: Write (memory address, data);
512 — Producer: Publish (memory address);
513 — Producer: Release (lock on memory address);
514 — Consumer: Read (memory address);

DATA SUBSCRIBE-AND-PUBLISH MECHANISMS AND METHODS FOR PRODUCER-CONSUMER PRE-FETCH COMMUNICATIONS

This invention was made with government support under Contract No. NBCHC020056 awarded by Defense Advanced Research Projects Agency (DARPA). The government has certain rights in this invention

BACKGROUND OF THE INVENTION

1. Technical Field

The present invention relates to pre-fetch operations in multiprocessor systems, and more particularly to data subscribe-and-publish mechanisms and methods for producer-consumer pre-fetch communications.

2. Discussion of Related Art

Pre-fetch operations have been widely used in modern computer systems to hide memory access latencies. In a multiprocessor system, a pre-fetch operation can be a vertical pre-fetch or a horizontal pre-fetch, also referred to as producer-consumer pre-fetch. A vertical pre-fetch can retrieve data from a high-level cache such as an L3 (level 3) cache to a low-level cache such as an L2 (level 2) cache. A horizontal pre-fetch can retrieve data from a cache in a producer node to a cache in a consumer node. A pre-fetch operation may involve both vertical and horizontal operations. In an SMP (symmetric multiprocessor) system, for example, a processor can issue a pre-fetch operation that retrieves data from the L2 cache in another processing node to the L1 (level 1) cache associated with the processor.

Pre-fetch operations can be invoked by software or by hardware. For example, the PowerPC® architecture comprises DCBT (data cache block touch) and DCBTST (data cache block touch for store) instructions that allow software to invoke pre-fetch operations at appropriate times. The IBM® POWER4 system comprises a data streaming pre-fetch mechanism that can, when a streaming access patterns is detected, retrieve data from the memory to an L3 cache, from the L3 cache to an L2 cache, and from the L2 cache to an L1 cache.

Pre-fetch operations in multiprocessor systems are subject to various inefficiencies due to a lack of coordination between a producer that generates data and a consumer that uses the data. In multiprocessor systems, pre-fetch operations can be consumer-initiated or producer-initiated, also referred to as pre-send or cache injection. The underlying cache coherence protocol may be made more complicated to deal with data pre-send operations, because a cache can receive data without a pending data request.

Regarding a consumer-initiated pre-fetch operation, if the consumer does not know when the data is to be produced at the producer side, it can be difficult for the consumer to invoke the data pre-fetch operation at an appropriate time. For example, if the consumer invokes the pre-fetch operation before the data is produced, the consumer would obtain a stale copy of the data. The stale copy of the data needs to be invalidated, resulting in extra cache coherence overhead.

Regarding a producer-initiated pre-fetch operation, if the producer does not know where the potential consumer resides, it can be difficult for the producer to determine, when newly produced data becomes available, where the data should be sent to. Even assuming that the producer knows where the consumer is, the producer may not know when it should send the data. If the data sent to a consumer is not the final data that is to be produced, for example, the data is not useful to the consumer and needs to be invalidated at the consumer side. Further, if the producer sends the data too early, the cache line holding the data at the consumer side can be replaced before the data is used by the consumer.

Therefore, a need exists for an effective data pre-fetch mechanism to support producer-consumer pre-fetch communications.

SUMMARY OF THE INVENTION

According to an embodiment of the present disclosure, a system supporting producer-consumer pre-fetch communications includes a first processor, wherein the first processor is a producer node and a second processor, wherein the second processor is a consumer node. The system further includes a data subscribe mechanism for performing a data subscribe operation at the consumer node, wherein the data subscribe operation records that a memory address is subscribed at the consumer node, a data publish mechanism for performing a data publish operation at the producer node, wherein the data publish operation sends data of the memory address from the producer node to the consumer node if the memory address is subscribed at the consumer node, and a communication network coupled to the producer node and the consumer node for enabling communicating between the producer node and the consumer node.

The data subscribe operation is invoked when a data subscribe instruction is executed by computer-executable code at the consumer node. The data publish operation is invoked when a data publish instruction is executed by computer-executable code at the producer node.

The system includes a subscribe prediction mechanism, the subscribe prediction mechanism determining when the data subscribe operation should be invoked. The subscribe prediction mechanism determines that the data subscribe operation should be invoked, if the memory address is found in an invalid cache state in a cache at the consumer node, the memory address has been accessed recently in the consumer node, and the data publish operation has been invoked at the producer node.

The system includes a publish prediction mechanism, the publish prediction mechanism determining when the data publish operation should be invoked. The publish prediction mechanism determines that the data publish operation should be invoked, if a cache line of the memory address is replaced from a cache in the producer node, and the cache line is in a modified cache state. The publish prediction mechanism determines that the data publish operation should be invoked, if the producer node sends data of the memory address to a peer node in the multiple processing nodes.

According to an embodiment of the present disclosure, a computer-implemented method of using data subscribe-and-publish operations for producer-consumer pre-fetch communications over a network includes (1) performing, by a consumer, a data subscribe operation, the data subscribe operation recording that a memory address is subscribed, (2) receiving, by the consumer, data of the memory address from a producer, and (3) caching, by the consumer, the data of the memory address for future use.

The method includes (1) producing, by the producer, the data of the memory address, (2) performing, by the producer, a data publish operation, the data publish operation sending the data of the memory address to the consumer if the memory address is subscribed, and (3) sending, by the producer, the data of the memory address to the consumer.

Performing a data subscribe operation comprises executing a data subscribe instruction. Performing a data publish operation comprises executing a data publish instruction. Performing a data subscribe operation comprises predicting, by a subscribe prediction mechanism, that the data subscribe operation should be invoked. Performing a data publish operation comprises predicting, by a publish prediction mechanism, that the data publish operation should be invoked.

According to an embodiment of the present disclosure, a program storage device is provided readable by machine, tangibly embodying a program of instructions executable by the machine to perform method steps for data subscribe and publish operations supporting producer-consumer pre-fetch operations. The method includes (1) performing, by a consumer, a data subscribe operation, the data subscribe operation is recording that a memory address is subscribed, (2) receiving, by the consumer, data of the memory address from a producer, and (3) caching, by the consumer, the data of the memory address for future use.

The method includes (1) producing, by the producer, the data of the memory address, (2) performing; by the producer, a data publish operation, the data publish operation sending the data of the memory address to the consumer if the memory address is subscribed, and (3) sending, by the producer, the data of the memory address to the consumer.

BRIEF DESCRIPTION OF THE DRAWINGS

Preferred embodiments of the present disclosure will be described below in more detail, with reference to the accompanying drawings.

DETAILED DESCRIPTION OF PREFERRED EMBODIMENTS

According to an embodiment of the present disclosure, a data subscribe-and-publish mechanism can effectively support producer-consumer pre-fetch communications in multi-processor systems. The mechanism comprises architecture support of two pre-fetch primitives, data subscribe and data publish. The data subscribe primitive allows a consumer to register its intention to obtain data of a memory address, without actually retrieving the data. The data publish primitive allows a producer to publish data of a memory address to the consumers that have subscribed the corresponding memory address.

Figure 1:
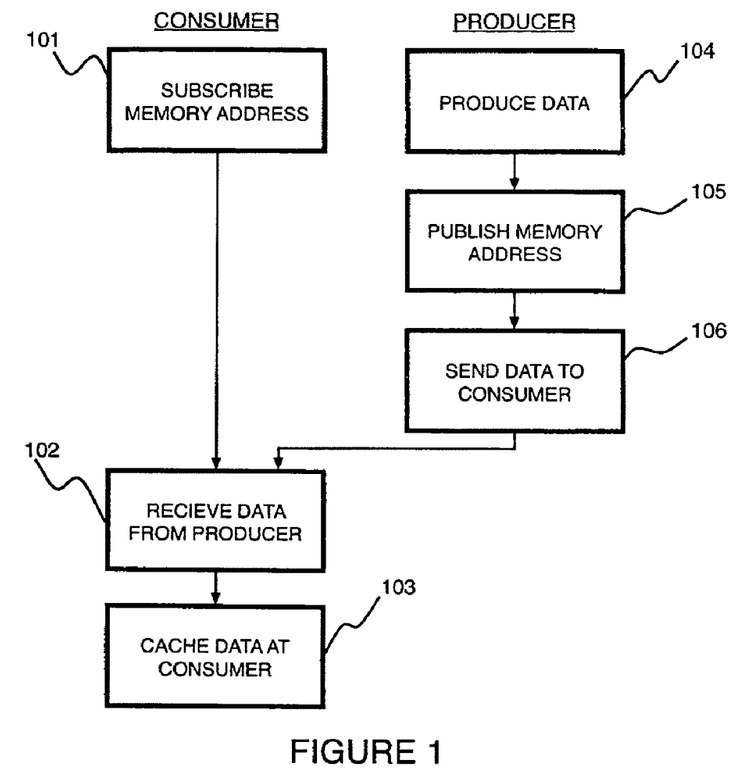
FIG. 1 is a flow chart of a method for data subscribe and publish operations according to an embodiment of the present disclosure.

FIG. 1 shows the flow chart of using data subscribe and publish operations for producer-consumer pre-fetch communications. At the consumer side, the consumer performs a data subscribe operation for a particular memory address (101). The data subscribe operation allows the consumer to receive data of the memory address once a data publish operation is performed at the producer side. When the consumer later receives the data from the producer (102), the consumer caches the data for future use (103). At the producer side, the producer produces data of the memory address (104), and performs a data publish operation for the memory address (105). The data publish operation causes the produced data to be sent to the consumer that has subscribed the memory address (106).

Figure 5A:
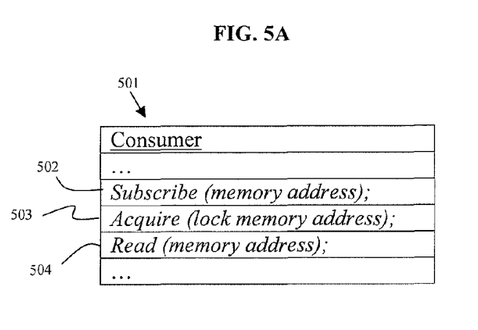
FIGS. 5A-C illustrate consumer and producer synchronization operations, respectively, according to an embodiment of the present disclosure.
Figure 5B:
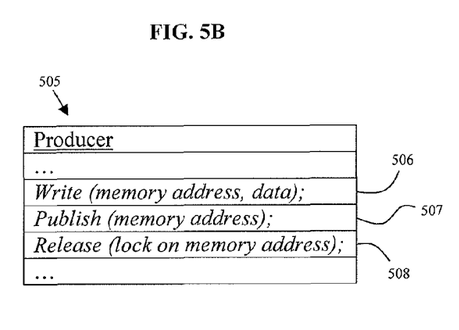
Figure 5C:
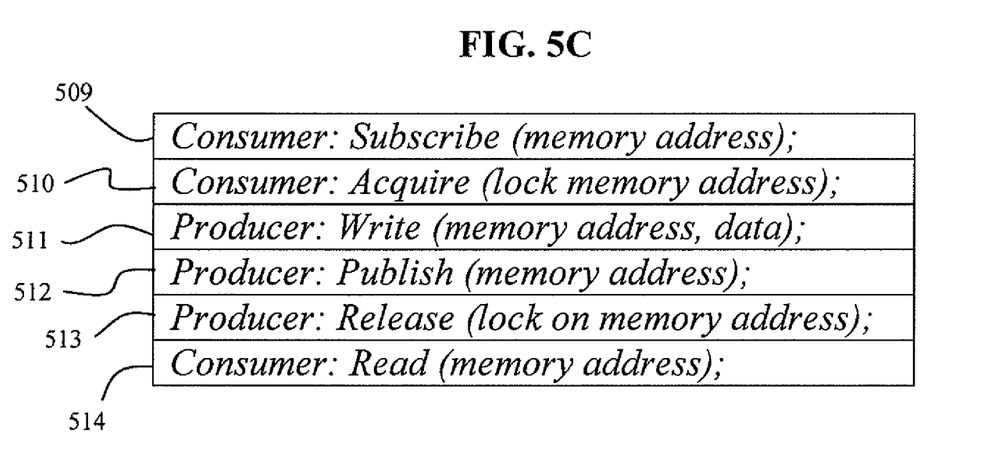

Consider a producer-consumer synchronization example, as shown in FIGS. 5A-5C. FIGS. 5A-5B show the steps occurring at each of the consumer side 501 and the producer side 505, respectively. FIG. 5C shows the order of the steps occurring at the consumer side 501 and the producer side 505 in relation to each other. A lock is used as a semaphore for producer-consumer coordination so that the consumer cannot access data of a memory address before the data is produced by the producer. At the consumer side 501 (see FIG. 5A), the consumer subscribes the memory address 502, acquires the lock 503 on the memory address, and reads the memory address 504. The subscribe operation informs the system that the consumer may need to access data of the memory address once the data is available. At the producer side 505 (see FIG. 5B), the producer writes data to the memory address 506, publishes the memory address 507, and releases the lock 508 on the memory address. The publish operation informs the system that data of the memory address has been produced and thus can be sent to the potential consumer.

| Consumer | Producer |
| --- | --- |
| ... | ... |
| Subscribe (address); | Write (address, data); |
| Acquire (lock); | Publish (address); |
| Read (address); | Release (lock); |
| ... | ... |

Figure 2A:
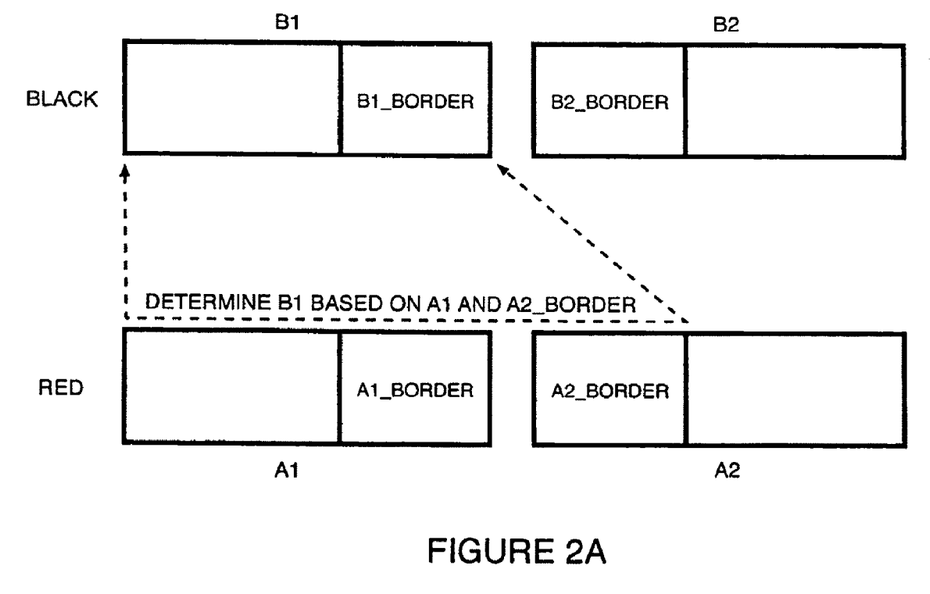
FIG. 2A is a diagram of two arrays that are used in an exemplary Red/Black iteration method.

Now consider an example of a Red/Black iteration method implemented using arrays A (red) and B (black) that are updated alternatively. Referring now to FIG. 2A, array A is partitioned into two sub-arrays A1 and A2, and array B is partitioned into two sub-arrays B1 and B2. Without losing generality, suppose array A contains initial data. Array B can be determined using array A: the sub-array B1 is determined based on A1 and boundary data from A2 (A2_BORDER), and the sub-array B2 is determined based on A2 and boundary data from A1 (A1_BORDER). Following the computation of array B, arrays A and B can switch roles. Array A can then be determined using array B: the sub-array A1 is determined based on B1 and boundary data from B2 (B2_BORDER), and the sub-array A2 is determined based on B2 and boundary data from B1 (B1_BORDER).

Figure 2B:
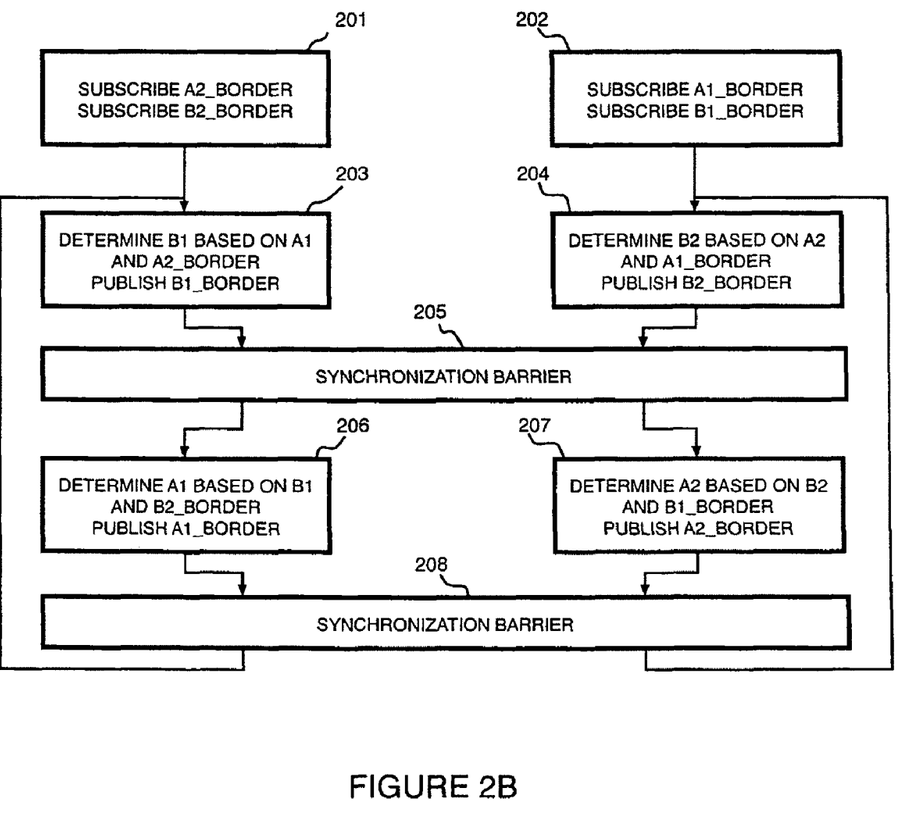
FIG. 2B is a flow chart of computation steps of two coordinating processes in the exemplary Red/Black iteration method.

| Process 1 | Process 2 |
| --- | --- |
| ... | ... |
| Subscribe A2_border; | Subscribe A1_border; |
| Subscribe B2_border; | Subscribe B1_border; |
| While (true) { | While (true) { |
|   Compute B1 using A1 and A2_border; |   Compute B2 using A2 and A1_border; |
|   Publish B1_border; |   Publish B2_border; |
|   Barrier; |   Barrier; |
|   Compute A1 using B1 and B2_border; |   Compute A2 using B2 and B1_border; |
|   Publish A1_border; |   Publish A2_border; |

-continued

| Process 1 | Process 2 |
|---|---|
| Barrier;<br>}<br>... | Barrier;<br>}<br>... |

Referring to FIG. 2B, two parallel processes can be used in the determinations: process 1 determines the sub-array A1 and B1, and process 2 determines the sub-array is A2 and B2. The two processes coordinate with each other using synchronization barriers: when a process reaches a synchronization barrier, it cannot move forward until the other process also reaches the corresponding synchronization barrier.

Since process 1 needs to access A2_BORDER and B2_BORDER for its determination, it subscribes the two memory regions (201). Process 1 determines B1 and publishes B1_BORDER (203). After passing a synchronization barrier (205), process 1 determines A1 and publishes A1_BORDER (206). After passing another synchronization barrier (208), process 1 repeats.

At the other side, process 2 subscribes A1_BORDER and B1_BORDER (202). Process 2 determines B2 and publishes B2_BORDER (204). After passing a synchronization barrier (205), process 2 determines A2 and publishes A2_BORDER (207). After passing another synchronization barrier (208), process 2 repeats.

The Subscribe-and-Publish Software Interface

According to an embodiment of the present disclosure, the system comprises primitives for software to subscribe and publish data of a memory address with proper granularity (e.g., byte, word or cache line). These primitives can be implemented as explicit instructions at the instruction set architecture level, or as additional semantics associated with appropriate existing instructions (e.g., the DCBT and DCBTST instructions in PowerPC).

Subscribe (address)
Publish (address)
Unsubscribe (address)

The effect of a subscribe operation can remain valid for some period of time. Alternatively, the effect of a subscribe operation can be sticky, wherein once a consumer subscribes an address, the subscription remains valid until an explicit unsubscribe operation is performed. It should be appreciated by those skilled in the art that when an address is subscribed, the system may return a subscription handler to software. This allows software to use the handler, instead of the memory address, when an unsubscribe operation is needed.

Rather than subscribing a single memory address, software can subscribe a memory address range or even a memory address pattern. An exemplary memory address pattern is a streaming pattern represented by d*x+c, wherein x is from 0 to n, d is a constant representing the stride of a stream, and c is a constant representing the starting address of the stream.

Subscribe (address_range)
Publish (address_range)
Unsubscribe (address_range)

The Subscribe-and-Publish Architecture Support

In multiprocessor systems such as CMP (chip multiprocessor) and SMP systems, architecture support for subscribe and publish operations can be seamlessly integrated with the underlying cache coherence support.

Figure 3:
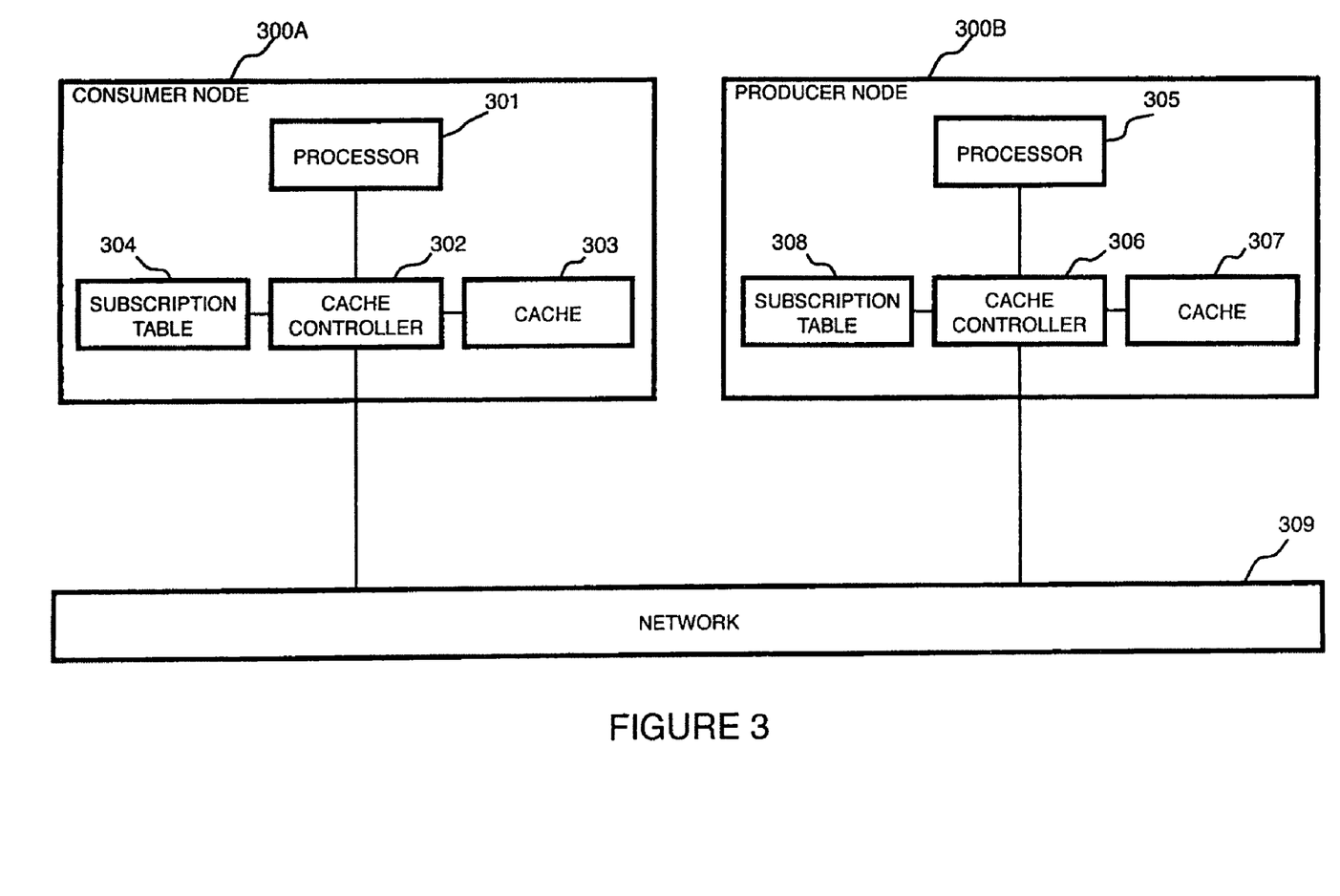
FIG. 3 is a diagram of a multiprocessor system that supports data subscribe and publish operations according to an embodiment of the present disclosure.

Referring now to FIG. 3, a multiprocessor system comprises a consumer node (300A) and a producer node (300B). The consumer node (300A) comprises a processor (301), a cache controller (302), a cache (303) and a subscription table (304). Likewise, the producer node (300B) comprises a processor (305), a cache controller (306), a cache (307) and a subscription table (308). The consumer node (300A) and the producer node (300B) can communicate with each other via a network (309).

In an exemplary embodiment of the present disclosure, the data subscribe and publish primitives can be implemented as follows. At the consumer side, when a subscribe operation is performed, the cache controller (302) at the consumer side records the subscribed memory address in the subscription table (304). The subscription table can record either the actual memory address, or a signature of the subscribed memory address, wherein the signature can be generated using one or more predefined hash functions. It should be noted that, if the memory address is found in the cache (although data of the memory address may be invalid in the cache), rather than recording the memory address in the subscription table, the cache controller can mark the corresponding cache line, indicating that the corresponding cache line has been subscribed. This allows a subscribed address to be recorded in the directory of the cache, which may reduce storage needed for the subscription table.

At the producer side, when a publish operation is performed, the cache controller (306) at the producer side sends a publish transaction to all peer caches in the system, or a subset of all peer caches in the system. When the consumer receives the publish transaction, its cache controller (302) snoops its cache directory and checks the corresponding subscription table (304) to determine if the memory address is subscribed. The cache controller (302) then sends a snoop response back to the producer, indicating whether the memory address is subscribed. When the producer receives snoop responses from all peer caches (or a subset of all peer caches in the system), it determines whether there exists at least one potential consumer that has subscribed the memory address. If the memory address is subscribed, the cache controller (306) at the producer side can send data to those caches that have indicated their intention of obtaining the data in their snoop responses.

It should be appreciated by those skilled in the art that, instead of sending a publish transaction, the producer can associate semantics of the publish transaction with a cache coherence message. For example, if the producer needs to send an invalidate request to all peer caches to obtain the exclusive ownership of a cache line, the producer can piggyback the publish transaction to the invalidate request. Further, when the producer receives subscription information regarding potential consumers that have subscribed a memory address, the producer can maintain the subscription information in a temporary buffer for future use to avoid sending another publish transaction later.

Since subscribe and publish operations are heuristic operations that cannot comprise correctness of the system, the subscription table can, if needed, treat a subscribed memory address as subscribed, and treat an unsubscribed address as subscribed. For example, if the subscription table records actual memory addresses, the subscription table can be full when a new memory address needs to be subscribed. In this case, the subscription table can remove a previously subscribed address according to a proper replacement policy so that the new memory address can be recorded in the subscription table.

An exemplary implementation of a subscription table recording signatures of memory addresses comprises a bit vector that can be indexed by one or more hash functions. When a memory address needs to be subscribed, the cache controller sets the corresponding one or more bits in the bit vector. Given a memory address, the cache controller can predict with some probability that the memory address is subscribed if the corresponding one or more bits are all set.

Instead of relying on software to initiate subscribe and publish operations, the system can have build-in hardware support to dynamically initiate subscribe and publish operations. For example, the system can comprise a subscribe prediction mechanism that predicts when a consumer should subscribe a given memory address. Further, the system can comprise a publish prediction mechanism that predicts when a producer should publish data of the memory address.

In an illustrative embodiment of the present disclosure, the system employs a subscribe prediction mechanism to predict whether an address is subscribed when a publish transaction is observed from network. A cache line is enhanced with reference information that indicates whether the cache line has been used since the data is brought to the cache. When data is first brought into the cache, its reference information indicates that the data has not been accessed yet. Each time the cache line is accessed, the reference information is set to indicate that the data has been used. The cache controller periodically clears the reference information. If the cache line is invalidated, the reference information remains, the reference information is lost if the cache line is used to hold data for another address. The reference information can be maintained using a reference bit or encoded with existing cache states.

When a publish transaction is received from the network, the cache controller snoops its cache directory. If the address is found (although the data is invalid) and the corresponding reference information shows that the data was used recently before it was invalidated, then the cache controller predicts that the address is subscribed. As a result, the snoop response indicates that the address is subscribed so that the producer should send the data. This subscribe prediction mechanism works well for producer-consumer pre-fetch communications if the set of consumers remain stable, and cache capacity miss rate is low so that an invalidated cache line can maintain its reference information.

According to an exemplary embodiment of the present disclosure, the system can employ a publish prediction mechanism to predict when a publish operation of a memory address needs to be performed. An exemplary publish prediction mechanism can predict a publish operation if a modified cache line is cast-out from the cache due to a cache line replacement. As a result, the cache controller can send a publish transaction to consult peer caches whether any of them has subscribed the memory address. Furthermore, the publish prediction mechanism can predict a publish operation if the cache is to supply data to another cache. Consider a scenario in which a consumer issues a memory read transaction that hits a modified cache line in a producer. In an SMP system, the consumer sends a read request to all peer caches (or a subset of all peer caches, depending on the underlying cache coherence protocol). When a cache receives the read request, the cache can indicate in its snoop response whether the address is subscribed. Thus, when all snoop responses are received, the consumer knows in which peer caches the address has been subscribed. The consumer can then send the data, or notify the producer to send the data, to the peer peers in which the address is subscribed.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
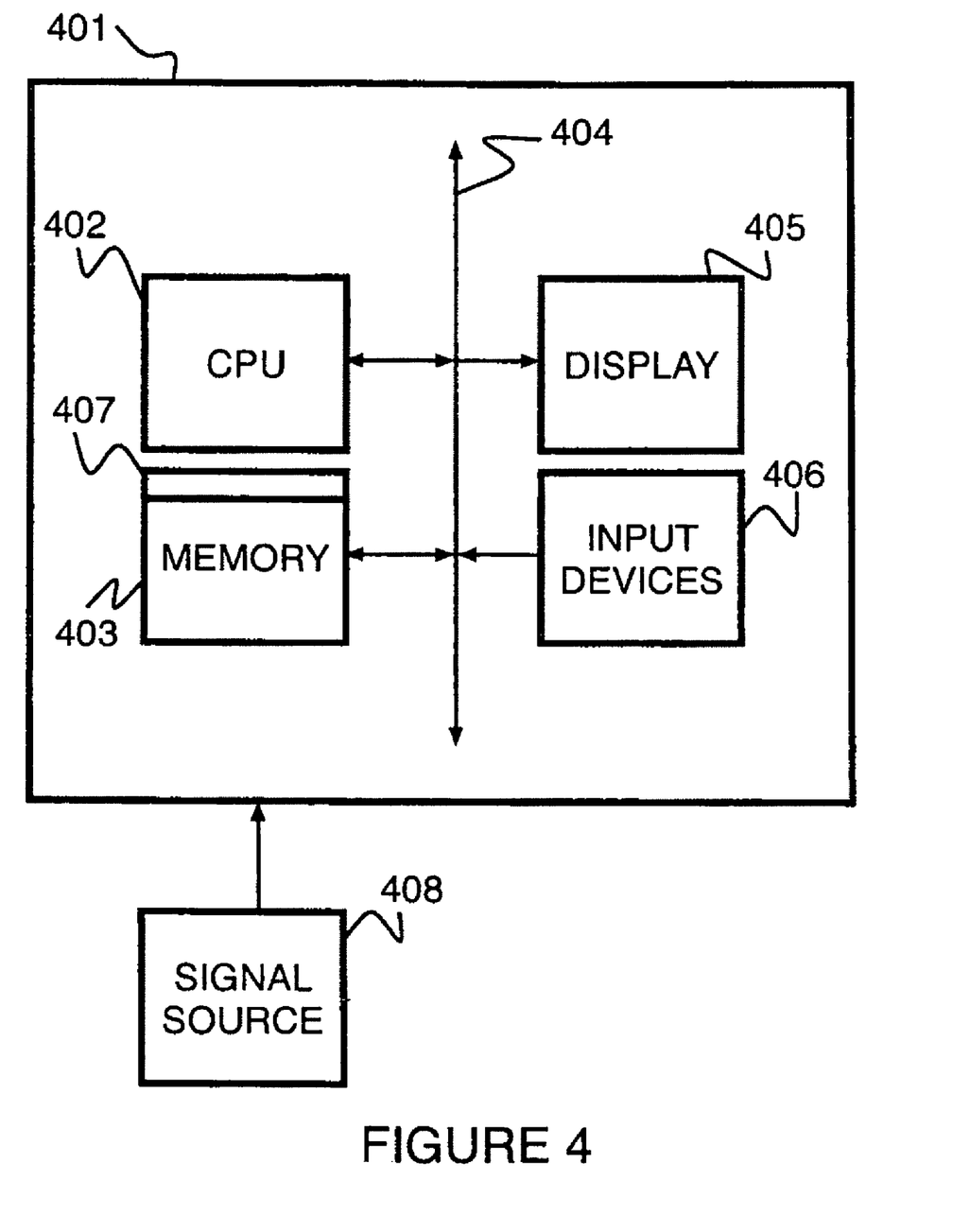
FIG. 4 is a computer system for implementing data subscribe and publish operations according to an embodiment of the present disclosure.

Referring to FIG. 4, according to an embodiment of the present invention, a computer system (401) for implementing data subscribe and publish operations to support producer-consumer pre-fetch communications can comprise, inter alia, a central processing unit (CPU) (402), a memory (403) and an input/output (I/O) interface (404). The computer system (401) is generally coupled through the I/O interface (404) to a display (405) and various input devices (406) such as a mouse and keyboard. The support circuits can include circuits such as cache, power supplies, clock circuits, and a communications bus. The memory (403) can include random access memory (RAM), read only memory (ROM), disk drive, tape drive, or a combination thereof. The present invention can be implemented as a routine (407) that is stored in memory (403) and executed by the CPU (402) to process the signal from the signal source (408). As such, the computer system (401) is a general-purpose computer system that becomes a specific-purpose computer system when executing the routine (407) of the present invention.

The computer platform (401) also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a mechanism and method for data subscribe and publish operations to support producer-consumer pre-fetch communications, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A system supporting producer-consumer pre-fetch communications, comprising:
    a first processor, wherein the first processor is a producer node;
    a second processor, wherein the second processor is a consumer node;
    a data subscribe mechanism for performing a data subscribe operation at the consumer node, wherein the data subscribe operation records that a memory address is subscribed to by the consumer node, and acquires a lock on the memory address for the consumer node upon the consumer node subscribing to the memory address, wherein the consumer node cannot access data at the memory address before valid data is subsequently written to the memory address by the producer node;
    a data publish mechanism for performing a data publish operation at the producer node subsequent to the data subscribe operation, wherein the data publish operation comprises writing the valid data to the memory address, publishing the memory address, and releasing the lock acquired by the data subscribe mechanism, enabling the consumer node to retrieve the valid data written to the memory address; and a communication network coupled to the producer node and the consumer node for enabling communication between the producer node and the consumer node, wherein the consumer node caches the valid data written to the memory address upon retrieval after the data publish operation.

2. The system of claim 1, wherein the data subscribe operation is invoked when a data subscribe instruction is executed by the consumer node.

3. The system of claim 1, wherein the data publish operation is invoked when a data publish instruction is executed by the producer node.

4. The system of claim 1, wherein the data subscribe mechanism records that the memory address is not subscribed at the consumer node when a data unsubscribe instruction is executed by the consumer node.

5. The system of claim 1, further comprising a subscription table stored at the consumer node, the subscription table recording the memory address when the data subscribe operation is performed.

6. The system of claim 1, wherein the consumer node marks a cache line of the memory address to indicate the memory address is subscribed, when the data subscribe operation is performed.

7. The system of claim 1, wherein the producer node sends a publish transaction to the consumer node when the data publish operation is performed, the publish transaction checks whether the memory address is subscribed at the consumer node.

8. The system of claim 1, further comprising a subscribe prediction mechanism, the subscribe prediction mechanism determining when the data subscribe operation should be invoked.

9. The system of claim 8, wherein the subscribe prediction mechanism determines that the data subscribe operation should be invoked, if the memory address is found in an invalid cache state in a cache at the consumer node, the memory address has been accessed since being recorded in the consumer node, and the data publish operation has been invoked at the producer node.

10. The system of claim 1, further comprising a publish prediction mechanism, the publish prediction mechanism determining when the data publish operation should be invoked.

11. The system of claim 10, wherein the publish prediction mechanism determines that the data publish operation should be invoked, if a cache of the memory address is replaced from a cache in the producer node, and the cache line is in a modified cache state.

12. The system of claim 10, wherein the publish prediction mechanism determines that the data publish operation should be invoked if the producer node sends the valid data written to the memory address to a peer node in the multiple processing nodes.

13. A computer-implemented method of using data subscribe-and-publish operations for producer-consumer pre-fetch communications over a network, comprising:

performing, by a consumer processor, a data subscribe operation, the data subscribe operation recording that a memory address is subscribed to by the consumer processor, and acquiring a lock on the memory address for the consumer processor upon the consumer processor subscribing to the memory address, wherein the consumer processor cannot access data at the memory address before valid data is subsequently written to the memory address by a producer processor;

performing, by the producer processor, a data publish operation, the data publish operation writing the valid data to the memory address, publishing the memory address, and releasing the lock acquired by the consumer processor, enabling the consumer processor to retrieve the valid data written to the memory address; and caching, by the consumer processor, the valid data written to the memory address upon retrieval after the data publish operation.

14. The computer-implemented method of claim 13, wherein performing a data subscribe operation comprises executing a data subscribe instruction.

15. The computer-implemented method of claim 13, wherein performing a data publish operation comprises executing a data publish instruction.

16. The computer-implemented method of claim 13, wherein performing a data subscribe operation comprises predicting, by a subscribe prediction mechanism, that the data subscribe operation should be invoked.

17. The computer-implemented method of claim 13, wherein performing a data publish operation comprises predicting, by a publish prediction mechanism, that the data publish operation should be invoked.

18. A non-transitory computer-readable medium embodying instructions executed by a processor to perform method steps for data subscribe and publish operations supporting producer-consumer pre-fetch operations, the method steps comprising:

performing, by a consumer, a data subscribe operation, the data subscribe operation recording that a memory address pattern is subscribed to by the consumer, and acquiring a lock on the memory address pattern for the consumer upon the consumer subscribing to the memory address pattern, wherein the consumer cannot access data of the memory address pattern before valid data is subsequently written to the memory address pattern by a producer;

performing, by the producer, a data publish operation, the data publish operation writing the valid data to the memory address pattern, publishing the memory address pattern, and releasing the lock acquired by the consumer, enabling the consumer to retrieve the valid data written to the memory address pattern; and caching, by the consumer, the valid data written to the memory address pattern upon retrieval after the data publish operation.

19. The non-transitory computer-readable medium of claim 18, wherein performing a data subscribe operation comprises predicting, by a subscribe prediction mechanism, that the data subscribe operation should be invoked.

20. The non-transitory computer-readable medium of claim 18, wherein performing a data publish operation comprises predicting, by a publish prediction mechanism, that the data publish operation should be invoked.

* * * * *